United States Patent
Feder et al.

(10) Patent No.: US 10,390,095 B2
(45) Date of Patent: Aug. 20, 2019

(54) AUTHORABLE CONTENT RATING SYSTEM

(71) Applicant: TiVo Solutions Inc., San Carlos, CA (US)

(72) Inventors: Adam Feder, Mountain View, CA (US); Brian Beach, Columbus, IN (US); Wijnand Van Stam, Sunnyvale, CA (US)

(73) Assignee: TiVo Solutions Inc., San Jose, CA (US)

( * ) Notice: Subject to any disclaimer, the term of this patent is extended or adjusted under 35 U.S.C. 154(b) by 0 days.

(21) Appl. No.: 14/879,341

(22) Filed: Oct. 9, 2015

(65) Prior Publication Data
US 2016/0037220 A1    Feb. 4, 2016

Related U.S. Application Data

(63) Continuation of application No. 11/649,427, filed on Jan. 3, 2007, now Pat. No. 9,167,305.

(51) Int. Cl.
*H04N 21/475* (2011.01)
*G06Q 30/02* (2012.01)
(Continued)

(52) U.S. Cl.
CPC ......... *H04N 21/4756* (2013.01); *G06Q 30/02* (2013.01); *H04N 21/252* (2013.01);
(Continued)

(58) Field of Classification Search
CPC ........... H04N 21/4788; H04N 21/4147; H04N 21/4756; H04N 21/4828
(Continued)

(56) References Cited

U.S. PATENT DOCUMENTS

| 5,973,683 A | 10/1999 | Cragun et al. |
| 6,493,688 B1 * | 12/2002 | Das .................... H04N 5/44543 348/E5.105 |

(Continued)

FOREIGN PATENT DOCUMENTS

| EP | 1 443 764 A | 8/2004 |
| WO | WO 02/19717 A | 3/2002 |
| WO | WO 2006/109314 A | 10/2006 |

OTHER PUBLICATIONS

United States Patent and Trademark Office, U.S. Appl. No. 11/649,427, Final Office Action dated Nov. 4, 2014.
(Continued)

*Primary Examiner* — Yassin Alata
(74) *Attorney, Agent, or Firm* — Haley Guiliano LLP

(57) ABSTRACT

Techniques for generating customized rating systems for use in a DVR are described. According to one technique, a user submits a rating system definition that comprises two or more different ratings of the user's choosing. The rating system definition is stored. The rating system definition defines a customized ratings system. That system's creator and other users may then associate various entities, such as channels, series, and episodes, with ratings from the customized rating system. DVRs may use these associations between entities and ratings for various purposes. For example, DVRs may use these associations to allow a user to search for entities that satisfy specified rating criteria. For another example, DVRs may use these associations to restricting which entities and information about those entities can be displayed or recorded when the DVR is in a restricted mode of operation. Customized rating systems may be modified by multiple users in collaboration.

27 Claims, 10 Drawing Sheets

(51) Int. Cl.
*H04N 21/4147* (2011.01)
*H04N 21/4788* (2011.01)
*H04N 21/482* (2011.01)
*H04N 21/25* (2011.01)
*H04N 21/258* (2011.01)
*H04N 21/45* (2011.01)

(52) U.S. Cl.
CPC ... *H04N 21/25891* (2013.01); *H04N 21/4147* (2013.01); *H04N 21/4532* (2013.01); *H04N 21/4751* (2013.01); *H04N 21/4788* (2013.01); *H04N 21/4828* (2013.01)

(58) Field of Classification Search
USPC ... 725/34–35, 39–40, 45–47, 51, 53, 68, 92, 725/100, 131, 133, 139, 141, 151, 153
See application file for complete search history.

(56) References Cited

U.S. PATENT DOCUMENTS

| | | | |
|---|---|---|---|
| 7,080,392 B1 * | 7/2006 | Geshwind | H04N 5/76 348/E7.031 |
| 9,167,305 B2 | 10/2015 | Feder et al. | |
| 2004/0001616 A1 | 1/2004 | Gutta et al. | |
| 2005/0076364 A1 | 4/2005 | Dukes et al. | |
| 2005/0091271 A1 | 4/2005 | Srinivas et al. | |
| 2005/0091671 A1 | 4/2005 | Deem et al. | |
| 2006/0161952 A1 | 7/2006 | Herz et al. | |
| 2007/0204287 A1 * | 8/2007 | Conradt | H04N 7/17309 725/28 |
| 2008/0127241 A1 | 5/2008 | Garcea | |
| 2008/0172689 A1 | 7/2008 | Feder et al. | |

OTHER PUBLICATIONS

United States Patent and Trademark Office, U.S. Appl. No. 11/649,427, Non-Final Office Action dated Jan. 22, 2015.
United States Patent and Trademark Office, U.S. Appl. No. 11/649,427, Notice of Allowance dated Jun. 5, 2015.
European Patent Office, Application No. 08705662.8, Office Action dated Jan. 10, 2014.
European Patent Office, Application No. 08705662.8, Pending Claims dated Jan. 10, 2014.

* cited by examiner

US 10,390,095 B2

AUTHORABLE CONTENT RATING SYSTEM

BENEFIT CLAIM

This application claims the benefit as a Continuation of U.S. patent application Ser. No. 11/649,427, filed Jan. 3, 2007, the entire contents of the preceding are hereby incorporated by reference as if fully set forth herein, under 35 U.S.C. § 120. The Applicant hereby rescinds any disclaimer of claim scope in the parent application or the prosecution history thereof and advises the USPTO that the claims in this application may be broader than any claim in the parent application.

FIELD OF THE INVENTION

The present invention relates to digital video recorders (DVRs), rating systems, and parental controls.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

The introduction of the DVR to the consumer world has revolutionized the way viewers watch and record television programs. DVRs eliminate many of the complications of VCRs and the need for video tapes. DVRs record television programs on a hard drive that is capable of storing a large number of television programs. Because DVRs are usually box-like in shape, and are often found sitting on top of the television sets to which they are connected, DVRs typically are included in the broad category of devices now called "set-top boxes." Much like VCRs, DVRs receive television signals (which may represent television programs and/or movies) as input from cables or satellite dishes, (or, in some cases, unlike VCRs, from broadband network connections) and also output television signals to a television set or other display.

The television programs and movies that a DVR records are often associated with ratings. Ratings are designed to give viewers some summarized understanding of the content that the viewers are viewing or about to view. For example, an MPAA "G" rating associated with a movie might suggest that the movie is appropriate for children to watch, at least in the opinion of the MPAA. In contrast, an MPAA "R" rating associated with a movie might suggest that children under the age of 17 ought not to watch the movie.

The reasons for a rating being associated with a movie might not be readily apparent from the rating itself, since there may be any of a number of reasons why a particular rating might be associated with the movie. For example, an MPAA "R" rating might be associated with a movie (a) because of the nature of the language used in the movie, (b) because of graphic violence being shown in the movie, or (c) because of certain types of nudity being shown in the movie. One often can only guess from an MPAA "R" rating which, or all, of these reasons a particular movie is rated "R."

Other rating systems exist. For example, other rating systems include TV Ratings and Advisories, Star Ratings, and various rating systems used in various countries. Some rating systems are more specific than others are. Some rating systems actually give the viewer more of a specific idea of what kind of content a particular television program or movie contains.

While many find existing rating systems useful, some viewers find many of them to be quite vague. Some viewers are not interested in the kind of information that existing rating systems convey. The kind of content-summarizing information that one viewer would find useful might be considered less useful by another viewer. Many viewers find themselves disagreeing with ratings that an authoritative ratings organization has assigned to a particular television program or movie. Unfortunately, these viewers often have little or no ability to change or influence either existing rating systems or ratings that are associated with specified television programs and movies.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
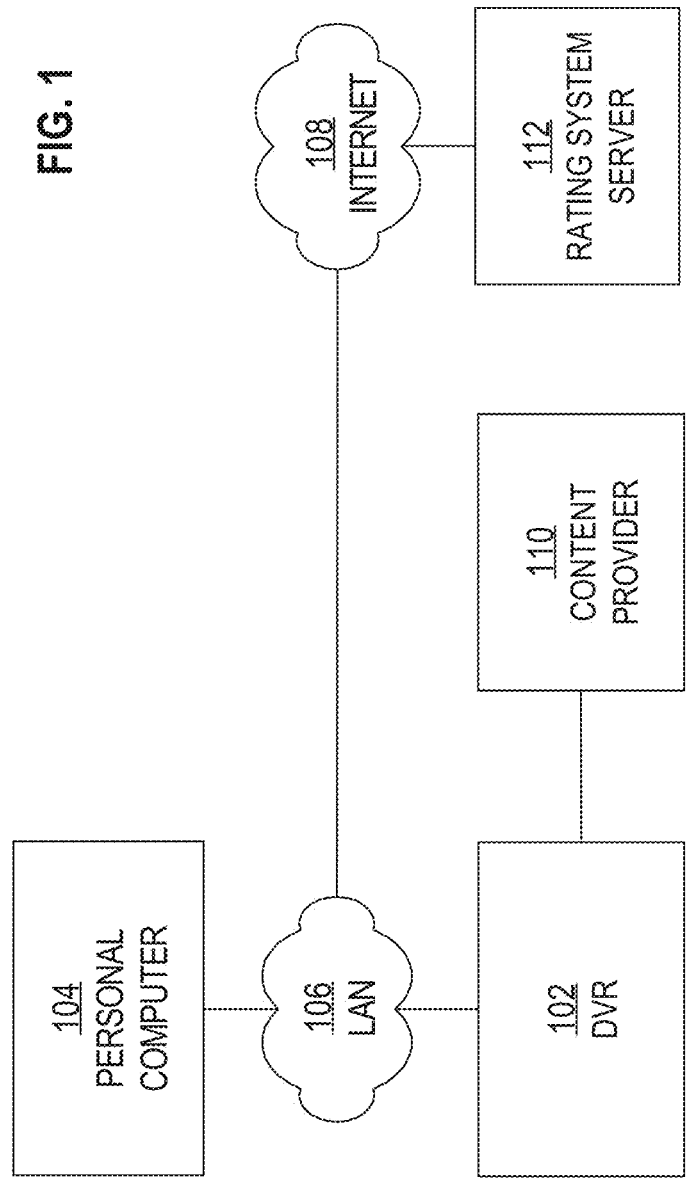
FIG. 1 is a block diagram that illustrates a system in which customized rating systems can be created and used at a DVR, according to one embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

In the following discussion, in references to the drawings like numerals refer to like parts throughout the several views.

Embodiments are described herein according to the following outline:
1.0 General Overview
2.0 System Structural Overview
3.0 Example Techniques
4.0 Example DVR
5.0 Implementation Mechanisms—Hardware Overview 1.0 General Overview Some DVRs come equipped with parental controls that allow a parent to specify that programs and movies that are associated with certain parent-selected ratings should not be shown by the DVR, at least when the DVR is in a "kid's" mode (as opposed to a "regular" mode). For example, a parent might configure a DVR's parental controls to cause the DVR to prevent, while in the "kid's" mode, the playing of live or recorded television programs and movies that are associated with either an "MA" or "R" rating. In this manner, a parent may thwart, at least to some extent, a child's efforts to view televised content that the parent deems to be inappropriate for the child.

According to one embodiment of the invention, a user-defined rating system definition is received from a user through a user interface at a client device such as a computer or DVR. The rating system definition may comprise two or more separate user-defined ratings. The user-defined ratings may be (but do not need to be) assigned a user-specified "restrictiveness" rank or order relative to each other in the rating system definition, such that one rating may be defined as being "more restrictive" or "less restrictive" than other ratings in the rating system definition (e.g., in a similar way to how an MPAA "R" rating is defined to be more restrictive than an MPAA "G" rating in the MPAA rating system). The rating system definition is sent from the client device to a server device. The rating system definition is stored at the server device. Rating systems that are defined by a rating system definition that is stored at the server device are referred to herein as "customized rating systems." In one embodiment of the invention, a rating system definition comprises potentially multiple "scales," with each such scale comprising two or more different ratings. For example, a rating system definition may comprise one "scale" that specifies an "overall" rating, and also additional separate "scales" that specify ratings for specific attributes such as sex, violence, language, dialog, etc.

In one embodiment of the invention, a user-specified association between (a) a user-selected entity, and (b) a user-selected rating within a customized rating system, is received through a user interface at a client device. For example, the entity may be a television channel, a movie, a television special, a sporting event, a television series (e.g., a "show" such as "Star Trek"), a specific episode within a television series (e.g., the Nth episode of a particular multi-episode "show," such as the episode "Mudd's Women" of "Star Trek"), a television special program, a television miniseries, other content downloadable over a network such as the Internet, a commercial or advertisement, etc. The association is stored at the server device. A rating that is associated with an entity is referred to herein as that entity's "entity rating."

Figure 12:
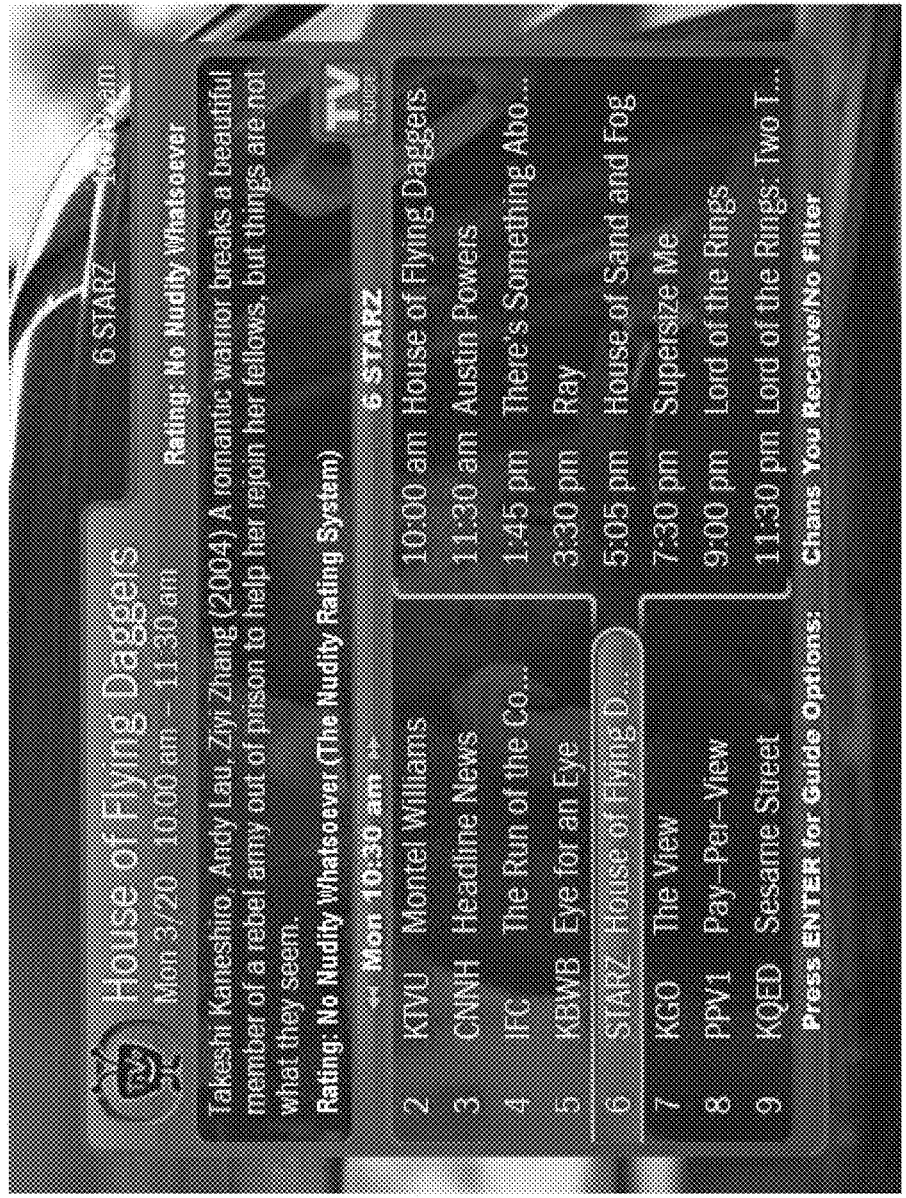
FIG. 12 is a diagram that shows an example of a DVR-generated screen that indicates a user-customized rating that is associated with a movie, according to one embodiment of the invention.

In one embodiment of the invention, an entity-to-rating association of the kind described above is transmitted from the server device to a DVR. The entity-to-rating association is stored at the DVR. Such an association may be used by the DVR for various purposes. In one embodiment of the invention, a rating that is associated with an entity (e.g., a channel, series, or episode) for which the DVR displays information (e.g., a name or title of the entity) in an electronic program guide (EPG) is also displayed in the EPG in connection with that entity. FIG. 12 is a diagram that shows an example of a DVR-generated screen that indicates a user-customized rating that is associated with a movie, according to one embodiment of the invention. In one embodiment of the invention, the DVR receives user-specified search criteria that include a user-selected rating from a customized rating system. The DVR searches a set of entities (e.g., channels, series, or episodes) for entities that satisfy the user-specified search criteria (e.g., entities that have been associated with a rating that is the same as, or, alternatively, "no more restrictive than," the user-selected rating in the same customized rating system). The DVR presents, to a viewer, a list of entities that satisfy the user-specified criteria.

In one embodiment of the invention, the DVR receives, through a user interface, a user-specified set of parental control criteria. The set of parental control criteria may indicate a "most restrictive allowed" rating that a user has selected from a customized rating system. The DVR also may receive, through the user interface, a viewer type definition. The viewer type definition defines characteristics of a group of viewers. For example, a viewer type definition might define a group of viewers as comprising all viewers (and only those viewers) who are under the age of 18. The DVR may receive, through the user interface, a user-specified association between a set of parental control criteria and a viewer type definition. In one embodiment of the invention, the set of parental control criteria, the viewer type definition, and the user-specified association between the former and the latter are stored at the DVR.

In one embodiment of the invention, different viewer type definitions correspond to different modes of operation (e.g., a "kid's mode," an "adult's mode," a "teenager's mode," a "general mode," etc.) to which the DVR can be set to operate. The DVR may be placed in a user-selected mode of operation (e.g., a "kid's mode") that corresponds to a particular viewer type definition (e.g., ages 12 and under) that is stored at the DVR. While in the user-selected mode of operation, before allowing any content (e.g., audio and video) or information (e.g., a name, title, or summary) that is associated with or represented by an entity (e.g., a channel, series, or episode) to be displayed, the DVR determines whether that entity's entity rating is the same as or "less restrictive than" the "most restrictive allowed" rating within the set of parental control criteria that are associated with the viewer type definition to which the currently selected mode of operation corresponds. If the entity's entity rating is not the same as or "less restrictive than" the "most restrictive allowed" rating, then the DVR prevents information and content that is associated with or represented by the entity from being displayed. In one embodiment of the invention, while the DVR is in a user-selected mode of operation as described above, the DVR additionally prevents information and content that is associated with or represented by unrated entities from being displayed.

In one embodiment of the invention, the server device (on which the rating system definitions are stored) transmits, to a DVR, a list of two or more existing customized rating systems, which might have been created by users other than the DVR's users. The DVR displays the list to a DVR user. The DVR user's selection of one or more of the existing customized rating systems within the list is received through a user interface that the DVR displays. The DVR sends, to the server device, an indication of which customized rating systems the DVR user has selected. In response, the server device transmits, to the DVR, rating system definitions for the selected customized rating systems. The DVR receives and stores the rating system definitions. Thus, in the same manner that a DVR may use customized rating systems defined by the DVR's users, a DVR may use customized rating systems that were created by users other than the DVR's users. When a rating system definition changes, the server device may automatically transmit the updated rating system definition to DVRs on which the rating system definition is stored. Additionally or alternatively, whenever a DVR establishes a connection to the server device, the DVR may determine whether any of the rating system definitions currently stored on the DVR have been updated at the server device. The DVR may download selected updated rating system definitions from the server device. After a rating system definition has been stored at the DVR, the DVR's user can rate entities with ratings from the rating system. The DVR's user may rate entities using a user interface presented by the DVR, for example. The entity ratings may be uploaded from the DVR to a server, so that the ratings can be made available to others.

In one embodiment of the invention, a "community rating" for an entity is automatically and periodically generated by combining (e.g., through averaging) ratings that multiple users have associated with that entity. For example, an entity may be associated with multiple entity ratings from each of several different customized rating systems. The server device may gather all of the entity's entity ratings that pertain to a particular one of the several customized rating systems. The server device may generate a "community rating" for the entity, relative to the particular customized rating system, based on all of the gathered entity ratings that pertain to the particular customized rating system. Thus, for each different customized rating system, the server device may generate a different "community rating" for an entity relative to that customized rating system; an entity may be associated with multiple different "community ratings" for multiple different customized rating systems. Whenever a user associates a new rating with an entity, that entity's "community rating" pertaining to the customized rating system from which the new rating was selected may be updated based on the new rating. In the same manner that a DVR user's specified entity ratings may be transmitted to and used at a DVR, "community ratings" generated based on multiple users' specified entity ratings may be transmitted to and used at the DVR. In one embodiment of the invention, a DVR can be configured to use either "community ratings" or entity ratings generated only by the DVR's users, as the DVR's users desire.

In one embodiment of the invention, rating system definitions stored at the server device can be designated, by the creators of those rating system definitions, as being either "open" or "closed." According to one embodiment of the invention, if a particular rating system definition has been designated as being "closed," then only the creator of the particular rating system definition is permitted to modify (e.g., through a user interface at a client device) the particular rating system definition (e.g., by adding, deleting, or changing ratings within the particular rating system definition). However, if a particular rating system definition has been designated as being "open," then users other than the particular rating system definition's creator are permitted to modify the particular rating system definition. Thus, under some circumstances, a customized rating system may be the collaborative product of the ideas and efforts of multiple users.

Embodiments of the invention summarized above are described below in greater detail, along with some alternative embodiments of the invention.

2.0 System Structural Overview

FIG. 1 is a block diagram that illustrates a system in which customized rating systems can be created and used at a DVR, according to one embodiment of the invention. The system shown is only one of many different systems in which embodiments of the invention may be implemented. Other systems in which embodiments of the invention may be implemented may include more or fewer components than those shown in FIG. 1.

The system shown in FIG. 1 comprises a DVR 102 (such as is described with reference to FIG. 5 below), a personal computer 104 (such as is described with reference to FIG. 4 below), a content provider 110 (such as a broadcaster, satellite television provider, cable television provider, etc.), and a rating system server 112. DVR 102 receives viewable content (e.g., movies, television programs, and associated metadata) from content provider 110. DVR 102 communicates with personal computer 104 through a LAN 106. LAN 106 is connected (e.g., through a network router) to the Internet 108. Rating system server 112 is also connected to Internet 108.

According to one embodiment of the invention, personal computer 104 comprises an Internet browser (e.g., Mozilla Firefox) which is capable of requesting web pages from and sending form data to rating system server 112 via LAN 106 and Internet 108. In one embodiment of the invention, DVR 102 requests data from and sends data to rating system server 112 via LAN 106 and Internet 108; thus, in one embodiment of the invention, DVR 102 can communicate with rating system server 112 for purposes similar to those for which personal computer 104 can communicate with rating system server 112. Rating system server 112 sends, to personal computer 104, a web page which comprises a user interface through which a user of personal computer 104 can specify a user-defined rating system definition. Personal computer 104 transmits such a user-defined rating system definition to rating system server 112 via LAN 106 and Internet 108. Rating system server 112 receives and stores such a user-defined rating system definition.

In one embodiment of the invention, personal computer 104 sends an entity rating to rating system server 112 via LAN 106 and Internet 108. Rating system server 112 receives and stores such a user-specified entity rating. Rating system server 112 sends entity ratings to DVR 102 via Internet 108 and LAN 106. DVR 102 receives and stores such entity ratings. DVR 102 uses the stored entity ratings for various purposes, some of which are described below.

3.0 Example Techniques 3.1 Creating a Customized Rating System

Figure 2:
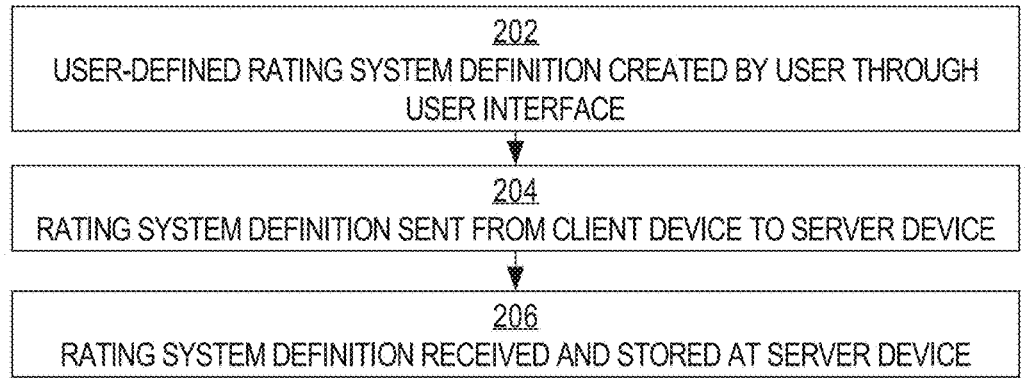
FIG. 2 is a flow diagram that illustrates the steps of a technique for creating a customized rating system, according to one embodiment of the invention.

FIG. 2 is a flow diagram that illustrates the steps of a technique for creating a customized rating system, according to one embodiment of the invention. In various alternative embodiments of the invention, more or fewer steps than those shown in FIG. 2 may be performed.

In block 202, a user-defined rating system definition is created by a user through a user interface. For example, a user of personal computer 104 may define a rating system definition, including one or more ratings, using a user interface contained within a web page that rating system server 112 sent to personal computer 104 via Internet 108 and LAN 106. The user may specify the name of the rating system definition, the number of ratings included in the rating system definition, the names of each of those ratings, and the "restrictiveness" of those ratings relative to each other. For example, the rating system definition might be called "the nudity rating system," and the ratings included in the rating system definition might include "extended frontal nudity," "brief frontal nudity," "extended non-frontal nudity," "brief non-frontal nudity," and "no nudity whatsoever." For another example, the rating system definition might be called "the age-based rating system," and the ratings included in the rating system definition might include various numbers that represent various ages. Each rating system definition defines as separate "customized rating system." Each "customized rating system" comprises (a) the name of that system, and (b) the ratings defined for that system.

In block 204, the rating system definition is sent from the client device to a server device. For example, personal computer 104 may send the rating system definition to rating system server 112 via LAN 106 and Internet 108.

In block 206, the rating system definition is received and stored at the server device. For example, system server 112 may receive the rating system definition via LAN 106 and Internet 108 and store the rating system definition.

As is discussed below, after a rating system definition has been created, entities can be assigned ratings from the rating system definition. For example, after "the nudity rating system" has been created, a DVR user might assign a first program a rating of "extended frontal nudity," a second program a rating of "no nudity whatsoever," and a third program a rating of "brief non-frontal nudity." Thereafter, when the DVR displays program guide information that includes the names and presentation times of several programs, the DVR may display, next to each program, the "nudity rating system" rating that has been assigned to that program (if any). Thus, if the program guide information includes the first, second, and third program, the DVR may display, next to the first, second, and third programs' names, the "extended frontal nudity," "no nudity whatsoever," and "brief non-frontal nudity" ratings, respectively. One technique by which such ratings may be assigned to programs is discussed below.

3.2 Associating Customized Ratings with Entities

Figure 3:
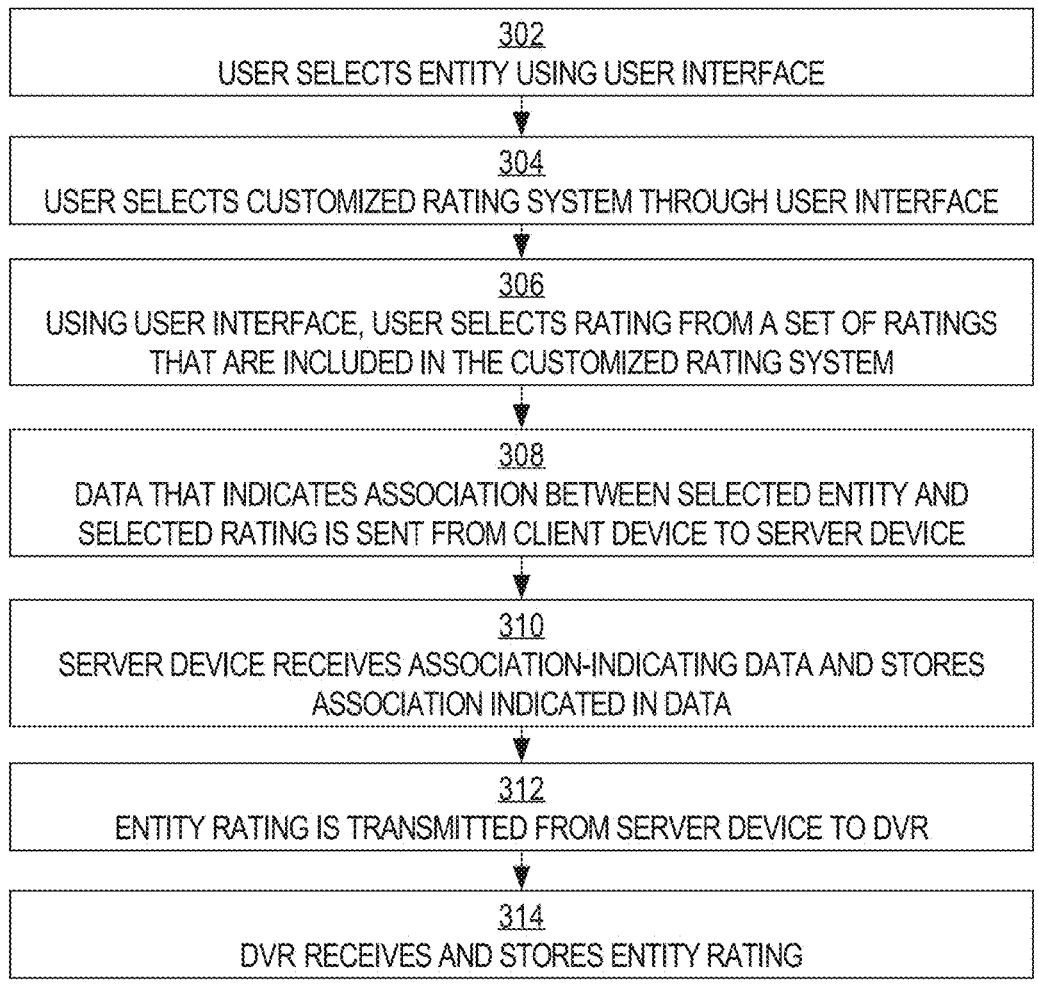
FIG. 3 is a flow diagram that illustrates the steps of a technique for associating a rating from a customized rating system with an entity, according to one embodiment of the invention.

FIG. 3 is a flow diagram that illustrates the steps of a technique for associating, with an entity, a rating from a customized rating system, according to one embodiment of the invention. In various alternative embodiments of the invention, more or fewer steps than those shown in FIG. 3 may be performed.

In block 302, using a user interface, a user selects an entity to be rated. As is discussed above, the entity may be a channel, a series, an episode, etc. The user may select the entity by supplying a name of the entity through the user interface and/or by selecting the entity from a list of multiple entities. For example, the user might select an entity from a web page that rating system server 112 sent to personal computer 104 via Internet 108 and LAN 106.

In block 304, using a user interface, the user selects a customized rating system, potentially from among a group of several different customized rating systems. The user may select the customized rating system by supplying a name of the customized rating system through the user interface and/or by selecting the customized rating system from a list of multiple customized rating systems. Such a list might include names of customized rating systems such as "the nudity rating system" and/or "the age-based rating system," among others, for example. As is discussed above, each customized rating system is defined by a separate rating system definition. For example, the user might select a customized rating system (e.g., "the nudity rating system") from a web page that rating system server 112 sent to personal computer 104 via Internet 108 and LAN 106. For another example, the user might select a customized rating system from a list of rating systems presented on a DVR-generated screen.

After selected a customized rating system, the user may select a rating from that customized rating system. In block 306, using a user interface, the user selects a rating (e.g., "brief frontal nudity") from a set of ratings that are included in the selected customized rating system. The user may select the rating from a list of ratings that the customized rating system includes, as defined by the customized rating system's rating system definition. For example, the user might select a rating from a web page that rating system server 112 sent to personal computer 104 via Internet 108 and LAN 106. For another example, the user might select a rating from a list of ratings presented on a DVR-generated screen.

In block 308, data that indicates an association between the selected entity and the selected rating is sent from a client device to a server device. For example, personal computer 104 might send such an association to rating system server 112 via LAN 106 and Internet 108. For another example, DVR 102 might send such an association to rating system server 112.

In block 310, the server device receives the association-indicating data and stores the association (i.e., the entity rating) indicated in the data. For example, rating system server 112 might receive such data that was sent from personal computer 104 and responsively store the entity rating that is indicated therein. An entity may be associated with multiple different entity ratings from multiple different users. Each entity rating may identify a user from which the entity rating was received. Additionally, each entity rating may identify the customized rating system to which the entity rating pertains, since different entity ratings associated with the same entity might pertain to different customized rating systems.

In block 312, the entity rating is transmitted from the server device to a DVR. For example, rating system server 112 might send the entity rating to DVR 102 via Internet 108 and LAN 106. Rating system server 112 might send entity ratings to DVR 102 periodically, and/or in response to requests from DVR 102.

In block 314, the DVR receives and stores the entity rating. For example, DVR 102 may receive the entity rating that system server 112 sent. DVR 102 may responsively store the entity rating. Although an embodiment of the invention discussed above permits a user to associate, with an entity, a single rating from a selected rating system, in an alternative embodiment of the invention, the user may select multiple ratings from a selected rating system. In such an alternative embodiment of the invention, all of the user-selected rating from the rating system may be associated with the entity. For example, a field of bits, in which each bit represents a different rating from a rating system, and in which the "set" bits represent user-selected ratings from that rating system, may be stored in association with an entity in one embodiment of the invention.

3.3 Displaying Customized Ratings

Figure 6:
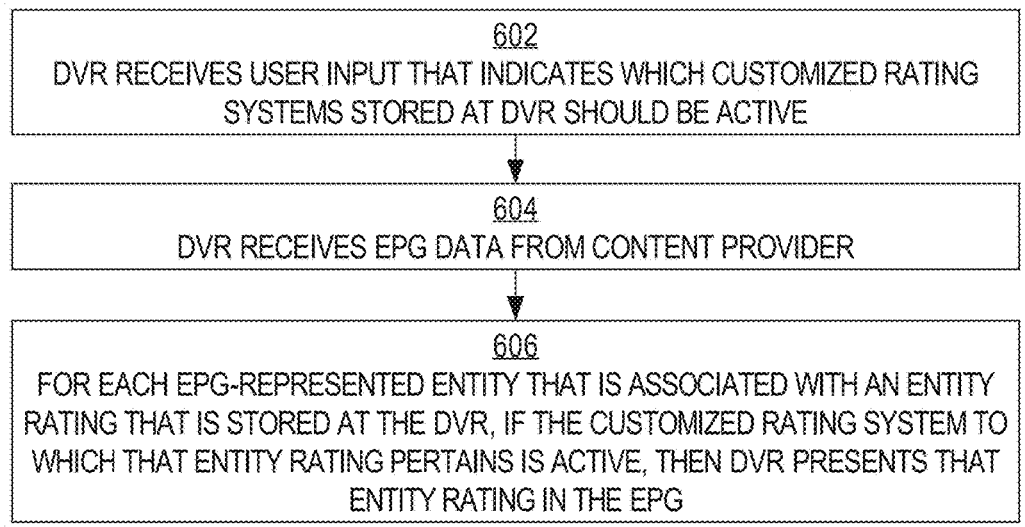
FIG. 6 is a flow diagram that illustrates the steps of a technique for displaying customized rating information in an EPG, according to one embodiment of the invention.

FIG. 6 is a flow diagram that illustrates the steps of a technique for displaying customized rating information in an EPG, according to one embodiment of the invention. In various alternative embodiments of the invention, more or fewer steps than those shown in FIG. 6 may be performed.

In block 602, a DVR receives user input that indicates which of the one or more customized rating systems stored at the DVR should currently be active. For example, a user of DVR 102 may provide such input to DVR 102 by using a remote control to select, within a user interface presented by DVR 102, one or more customized rating systems from a list of customized rating systems that are defined at DVR 102. In response to receiving such user input, DVR 102 designates the selected customized rating systems as being "active."

In block 604, the DVR may receive EPG data from a content provider. For example, DVR 102 may receive EPG data from content provider 110 periodically;
  additionally or alternatively, content provider 110 may transmit EPG data to DVR 102 in response to requests from DVR 102. Alternatively, the DVR may already have the EPG data. The EPG data represents information about one or more entities (e.g., channels and associated channel names, programs and associated program names, the channels on which those programs are being shown, the times at which those programs are being shown, etc.)

In block 606, for each EPG-represented entity that is associated with an entity rating that is stored at the DVR, if the customized rating system to which that entity rating pertains is currently designated as being active, the DVR presents that entity rating in the EPG in connection with other information about that entity in the EPG. For example, in the EPG, DVR 102 may display a list of one or more channels with their associated channel names, channel numbers, or other channel identifiers. In close proximity to each channel name, DVR 102 may display one or more entity ratings for that channel. Additionally, DVR 102 may display a list of one or more programs with their associated program names. In close proximity to each program name, program title, or other program identifier, DVR 102 may display one or more entity ratings for the series and/or episode to which that program belongs. For example, next to a program name displayed in an EPG, DVR 102 might display the rating "brief non-frontal nudity" from "the nudity rating system."

FIG. 12 is a diagram that shows an example of a DVR-generated screen that indicates a user-customized rating that is associated with a movie, according to one embodiment of the invention. The screen displays customized rating information for a movie called "House of Flying Daggers." As is shown on the screen, the user-customized rating that has been associated with this movie is the "no nudity whatsoever" rating from "the nudity rating system," which is a customized, user-defined rating system. Thus, even though the MPAA might have rated "House of Flying Daggers" with a rating of "PG-13," the DVR user can see a rating that reflects more specific information about an aspect of the movie in which the user is especially interested. The user himself might have previously associated the "no nudity whatsoever" rating with the movie. Alternatively, another user of another DVR in another household might have associated this rating with the movie.

3.4 Searching for Entities Using Customized Ratings

Figure 7:
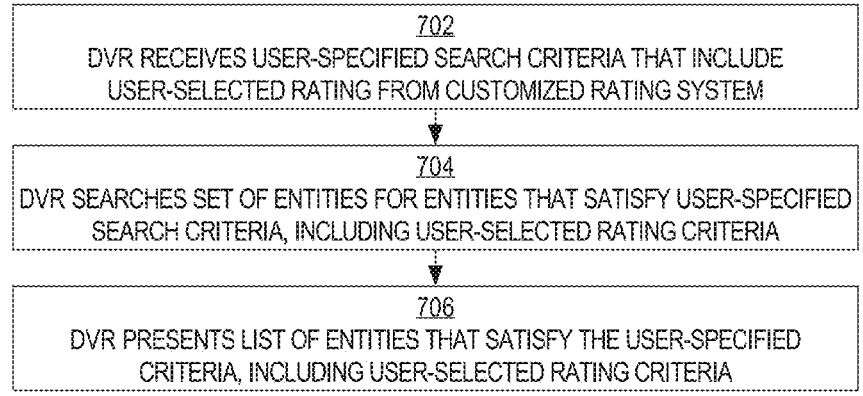
FIG. 7 is a flow diagram that illustrates the steps of a technique for displaying a set of entities that satisfy user-specified search criteria that include rating criteria, according to one embodiment of the invention.

FIG. 7 is a flow diagram that illustrates the steps of a technique for displaying a set of entities that satisfy user-specified search criteria that include rating criteria, according to one embodiment of the invention. In various alternative embodiments of the invention, more or fewer steps than those shown in FIG. 7 may be performed.

In block 702, a DVR receives user-specified search criteria that include a user-selected rating from a customized rating system. For example, DVR 102 may receive such search criteria through a user interface that a user navigates using a remote control. The search criteria might indicate, for example, that the user wants to see a list of all episodes that have been associated with a rating of "extended frontal nudity" or a less restrictive rating from "the nudity rating system." For another example, the search criteria might indicate that the user wants to see a list of all channels that have been associated with a rating of "12 and younger" or a less restrictive rating from another customized rating system. The user-specified search criteria may indicate the type of entities (e.g., channels, series, or episodes) for which the user wants to search. The user-specified search criteria may indicate whether the entities returned as results of the search should have ratings that are the same as, "no more restrictive than," or "no less restrictive than" the rating indicated in the search criteria.

In block 704, the DVR searches a set of entities (e.g., channels, series, or episodes) for entities that satisfy the user-specified search criteria (e.g., entities that have been associated with a rating that is the same as, or "no more restrictive than," the user-selected rating in the same customized rating system). For example, DVR 102 may search EPG information and entity ratings stored at DVR 102 for entities that satisfy the search criteria, including the rating criteria. Although the search described with reference to block 704 is described as being performed by the DVR, in an alternative embodiment of the invention, such a search is performed by a server that is external to the DVR; the DVR may communicate with such a server via a communication mechanism such as the Internet, for example. In such an alternative embodiment of the invention, the DVR-external server may perform the search in response to a command received from the DVR's user via an Internet web site, or in response to a command received from the DVR itself. The server may return, to the DVR, identities of the entities that satisfy the user-specified search criteria.

In block 706, the DVR presents, to a viewer, a list of entities that satisfy the user-specified criteria. For example, the DVR might present a list of episodes that are associated with a rating of "extended frontal nudity" or a less restrictive rating from "the nudity rating system."

3.5 Restricting Dvr Use Based on Customized Ratings

Figure 8:
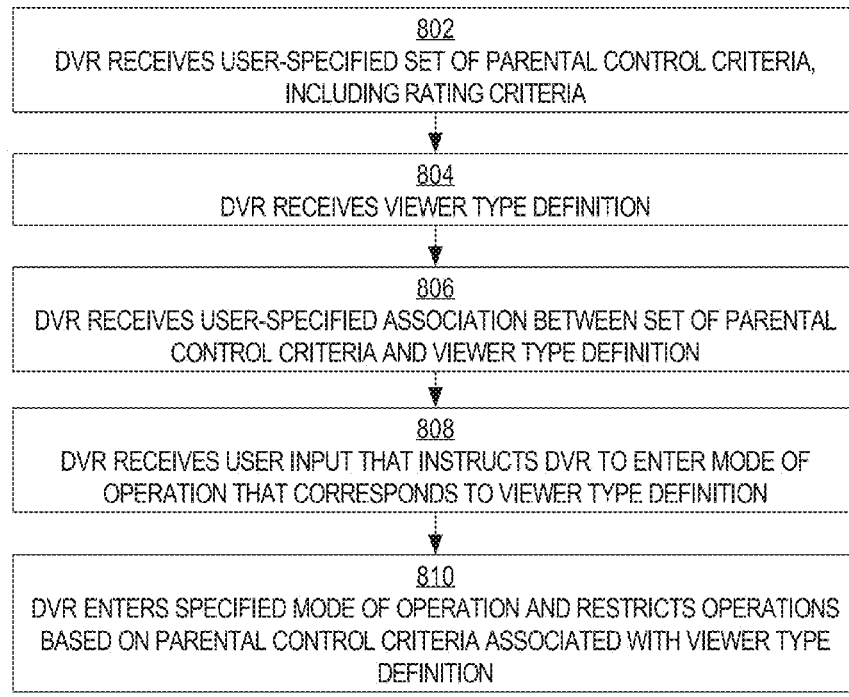
FIG. 8 is a flow diagram that illustrates the steps of a technique for restricting the kinds of entities (and information about those entities) that a DVR can display while the DVR is in a particular mode of operation, according to one embodiment of the invention.

FIG. 8 is a flow diagram that illustrates the steps of a technique for restricting the kinds of entities (and information about those entities) that a DVR can display while the DVR is in a particular mode of operation, according to one embodiment of the invention. In various alternative embodiments of the invention, more or fewer steps than those shown in FIG. 8 may be performed.

In block 802, a DVR receives, through a user interface, a user-specified set of parental control criteria. For example, DVR 102 may receive and store such a set of parental control criteria. The set of parental control criteria may indicate a "most restrictive allowed" rating that a user has selected from a customized rating system. Alternatively, the set of parental control criteria may indicate a "least restrictive allowed" rating that a user has selected from a customized rating system. Alternatively, the set of parental control criteria may indicate a range of allowed ratings that a user has selected from a customized rating system; for example, such a range could include all ratings that are both more restrictive than the "no nudity whatsoever" rating and less restrictive than the "extended non-frontal nudity" rating from "the nudity rating system." If the customized rating system is age-based, then the parental control criteria may indicate the oldest age, or youngest age, or a range of ages, that are allowed to be associated with entities that the DVR will display while in a particular mode of operation.

In block 804, the DVR receives, through the user interface, a viewer type definition. The viewer type definition defines characteristics of a group of viewers. For example, a viewer type definition might define a group of viewers as comprising all viewers (and only those viewers) who are under the age of 18. For example, DVR 102 may receive and store such a viewer type definition.

In block 806, the DVR receives, through the user interface, a user-specified association between a set of parental control criteria (as defined in block 802) and a viewer type definition (as defined in block 804). For example, DVR 102 may receive, through a user interface, user input that directs DVR 102 to establish an association between (a) a set of parental control criteria that includes an age-based "least restrictive allowed" rating of "18" from a customized age-based rating system and (b) a viewer type definition of "minors." For another example, DVR 102 may receive user input that directs DVR 102 to establish an association between (a) a set of parental control criteria that includes a "least restrictive allowed" rating of "no nudity whatsoever" from "the nudity rating system" and (b) a viewer type definition of "kids." DVR 102 may store the association between the selected parental control criteria and the selected viewer type definition.

In block 808, the DVR receives user input that instructs the DVR to enter a user-specified mode of operation that corresponds to a stored viewer type definition. For example, if one of the stored viewer type definitions is "kids," then DVR 102 may receive user input that instructs DVR 102 to enter a "kids" mode of operation. For another example, if one of the stored viewer type definitions is "adults," then DVR 102 may receive user input that instructs DVR 102 to enter an "adults" mode of operation. In one embodiment of the invention, in response to receiving user input that instructs DVR 102 to enter a specified mode of operation, DVR 102 requests a password, and will not change the current mode of operation unless provided with a password that matches a previously-specified password.

In block 810, the DVR enters the user-specified mode of operation. While in the user-selected mode of operation, before allowing any content (e.g., audio and video) or information (e.g., a name, title, or summary) that is associated with or represented by an entity (e.g., a channel, series, or episode) to be displayed, the DVR determines whether that entity's entity rating within the "allowable" ratings that are associated with the viewer type definition that corresponds to that mode of operation. If the entity's entity rating is not within these "allowable" ratings, then the DVR prevents information and content that is associated with or represented by the entity from being displayed.

For example, while in a "kids" mode of operation, corresponding to a "kids" viewer type definition, DVR 102 might receive a request to display an EPG. In response, DVR 102 may determine, for each channel in the EPG, whether that channel is associated with a rating that is "allowable" in view of the parental control criteria that are associated with the "kids" viewer type definition. For each channel that is associated with a rating that is not "allowable," DVR 102 may prevent any information about that channel from being displayed in the EPG. Such channels may simply be absent from the EPG so that their existence is not even suspected. Similarly, in response to a user's request to tune the DVR to a channel that is associated with a rating that is not "allowable," DVR 102 may prevent the channel from changing, or change to another channel that is associated with a rating that is "allowable." Additionally, for each series, episode, or other entity that is associated with a rating that is not "allowable," DVR 102 may prevent any information about that entity from being displayed in the EPG, and DVR 102 may prevent all audio and video content within that entity from being displayed or recorded.

3.6 Using Other Users' Customized Rating Systems

Figure 9:
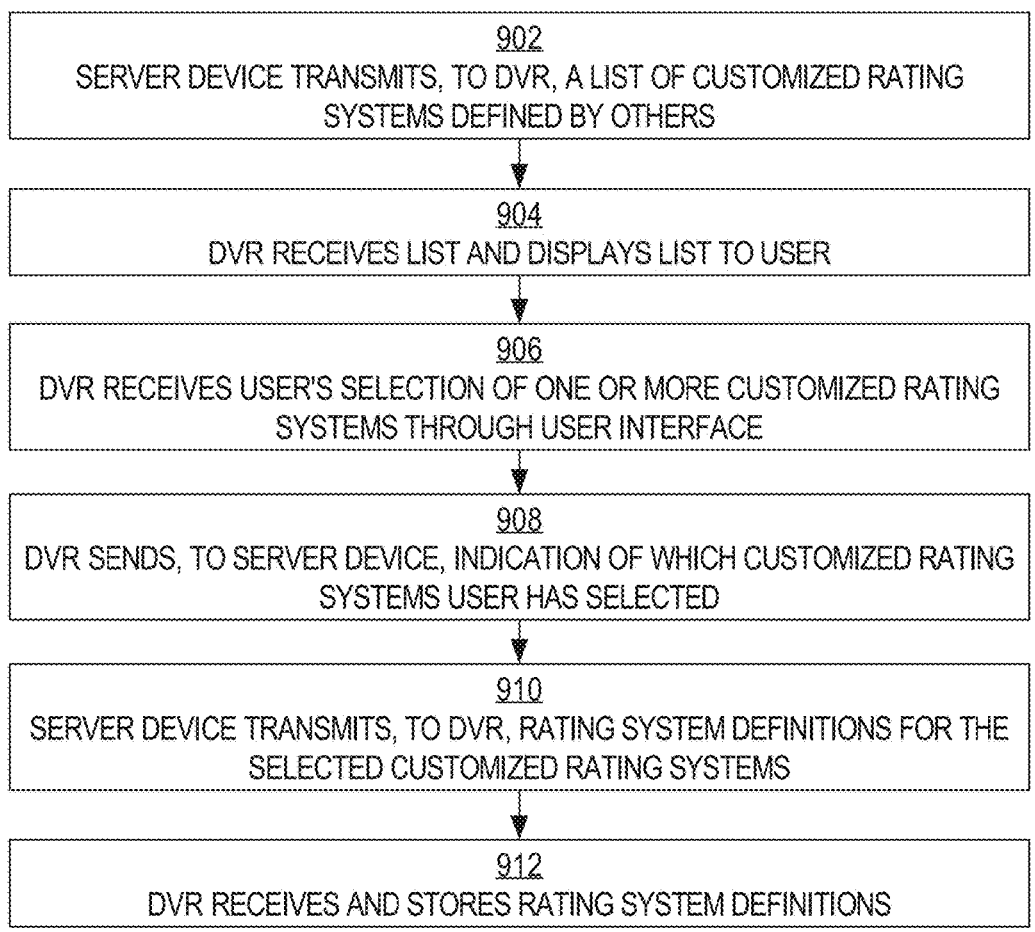
FIG. 9 is a flow diagram that illustrates the steps of a technique for using, at a DVR, a customized rating system that has been defined by one or more users other than those who use the DVR, according to one embodiment of the invention.

FIG. 9 is a flow diagram that illustrates the steps of a technique for using, at a DVR, a customized rating system that has been defined by one or more users other than those who use the DVR, according to one embodiment of the invention. In various alternative embodiments of the invention, more or fewer steps than those shown in FIG. 9 may be performed.

In block 902, a server device, on which one or more rating system definitions are stored, transmits, to a DVR, a list of two or more existing customized rating systems. Although the specific embodiment described in the foregoing example involves the rating system definitions being sent to and selected from a DVR, other embodiments may involve the rating system definitions being sent to and selected from a personal computer (e.g., via a web page) instead. One or more of these customized rating systems may be defined by users other than the DVR's users—users who may live in different houses, different cities, and even different nations that those in which the DVR's users live. For example, rating system server 112 may send such a list to DVR 102 via LAN 106 and Internet 108.

In block 904, the DVR receives the list and displays the list to a DVR user. Although the specific embodiment described in the foregoing example involves the list being received and displayed by a DVR, other embodiments may involve the rating system definitions being received and displayed by a personal computer (e.g., via a web page) instead. For example, DVR 102 may receive the list and display the list to a viewer who has requested the display of such a list. The list might contain, for example, customized rating systems such as "the age-based rating system," "the swear word rating system," "the respect rating system," and "the long hair rating system," which other users created using techniques described above.

In block 906, the DVR user's selection of one or more of the existing customized rating systems within the list is received through a user interface that the DVR displays. Although the specific embodiment described in the foregoing example involves the user's selection being received through a DVR, other embodiments may involve the user's selection being received through a personal computer instead. For example, DVR 102 may receive user input that indicates the DVR user's selection of one or more of the customized rating systems displayed in the list. The DVR user might select "the long hair rating system" from the list using a remote control, for example.

In block 908, the DVR sends, to the server device, an indication of which customized rating systems the DVR user has selected. Although the specific embodiment described in the foregoing example involves the selection indication being sent from a DVR, other embodiments may involve the rating system definitions being sent from a personal computer instead. For example, DVR 102 may send, to rating system server 112, data that indicates that the DVR user selected "the long hair rating system." If the indication is sent to the server device from a personal computer, then additional information that identifies one or more DVRs to which the server device should transmit rating system definitions also may be sent to the server device from the personal computer. Such additional information may comprise one or more DVR identifiers and/or a user account identifier (which previously might have been associated with one or more DVR identifiers), for example.

In block 910, in response to receiving the data that the DVR (or other device) sent in block 908, the server device transmits, to the DVR, rating system definitions for the selected customized rating systems. For example, rating system server 112 may transmit, to DVR 102 via Internet 108 and LAN 106, a rating system definition for "the long hair rating system," which was not previously stored at DVR 102.

In block 912, the DVR receives and stores the rating system definitions. For example, DVR 102 may receive and store the rating system definitions that rating system server 112 sent to DVR 102 in block 910. For example, DVR 102 may receive and store the rating system definition for "the long hair rating system." Thereafter, users of DVR 102 can use "the long hair rating system" to associate ratings with entities, to specify parental controls, to view rating information associated with entities, to search for entities that satisfy user-specified rating criteria, and/or for other purposes. Thus, in the same manner that a DVR may use customized rating systems defined by the DVR's users, a DVR may use customized rating systems that were created by users other than the DVR's users.

When a rating system definition changes, the server device may automatically transmit the updated rating system definition to DVRs on which the rating system definition is stored. Additionally or alternatively, whenever a DVR establishes a connection to the server device, the DVR may determine whether any of the rating system definitions currently stored on the DVR have been updated at the server device. Alternatively, the server device may make such a determination whenever the DVR establishes a connection with the server device. The DVR may download selected updated rating system definitions from the server device. The server device may instruct the DVR to perform such a download.

3.7 Generating a Community Rating

Figure 10:
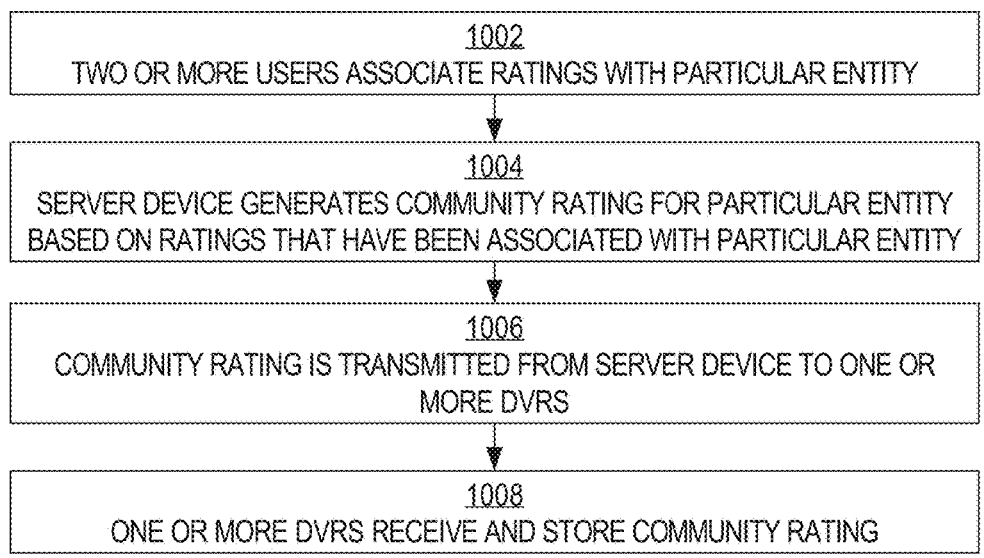
FIG. 10 is a flow diagram that illustrates the steps of a technique for generating a "community rating" for an entity, according to one embodiment of the invention.

FIG. 10 is a flow diagram that illustrates the steps of a technique for generating a "community rating" for an entity, according to one embodiment of the invention. In various alternative embodiments of the invention, more or fewer steps than those shown in FIG. 10 may be performed.

In block 1002, two or more users associate ratings with a particular entity. For example, at different times and from different locations and using different client devices, ten different users may associate ten different ratings (pertaining to the same customized rating system) with a particular episode. The users may associate the ratings with the episode using the technique described above with reference to FIG. 3, for example. For example, one user might associate the particular episode with a rating of "extended frontal nudity" from "the nudity rating system" and another user might associate the particular episode with a rating of "brief frontal nudity" from "the nudity rating system." All of these ratings are stored at the server device as described above.

In block 1004, the server device generates a community rating for the entity based on all of the ratings (pertaining to the same customized rating system) that have been associated with the entity. For example, rating system server 112 may assign values to each of the particular entity's entity ratings based on the "restrictiveness" of those ratings, calculate the average of those values, and then select, as the entity's community rating, the rating whose assigned value is closest to the average. Inasmuch as a single entity may be associated with entity ratings from multiple different customized rating systems, a separate community rating may be generated for an entity for each of the different customized rating systems from which the entity has received an entity rating. For example, an entity might have one community rating that pertains only to "the nudity rating system," and that same entity might have another community rating that pertains only to "the age-based rating system."

Each community rating may be automatically and periodically generated. Additionally or alternatively, an entity's community rating pertaining to a particular customized rating system may be regenerated and updated each time that a new entity rating pertaining to the particular customized rating system becomes associated with that entity.

In block 1006, the community rating is transmitted from the server device to one or more DVRs. For example, rating system server 112 might send the community rating to DVR 102 via Internet 108 and LAN 106. Rating system server 112 might send the community rating to other DVRs as well. Rating system server 112 might send community ratings to DVR 102 and other DVRs periodically, and/or in response to requests from DVR 102 and other DVRs. In one embodiment of the invention, rating system server 112 sends a community rating that pertains to a particular customized rating system to DVR 102 only if DVR 102 currently stores the rating system definition for the particular customized rating system; thus, community ratings that do not pertain to customized rating systems in which a DVR's users have expressed interest do not need to be transmitted to that DVR.

In block 1008, the one or more DVRs receive and store the community rating. For example, DVR 102 may receive the community rating that system server 112 sent. DVR 102 may responsively store the community rating. In the same manner that a DVR user's specified entity ratings may be transmitted to and used at a DVR, "community ratings" generated based on multiple users' specified entity ratings may be transmitted to and used at the DVR. For example, community ratings can be used in place of or in addition to an individual user's specified ratings as those individual user's specified ratings are used in the techniques described above with reference to FIGS. 6-8. In one embodiment of the invention, a DVR can be configured to use either "community ratings" or entity ratings generated only by the DVR's users, as the DVR's users desire.

3.8 Collaborative Customized Rating Systems

In one embodiment of the invention, rating system definitions stored at the server device can be designated, by the creators of those rating system definitions, as being either "open" or "closed." Referring again to FIG. 2, in block 202, in addition to the name of the rating system definition, the number of ratings included in the rating system definition, the names of each of those ratings, and the "restrictiveness" of those ratings relative to each other, a creator of the rating system definition may specify whether the customized rating system defined by the rating system definition is "open" or "closed." The server device may store this designation along with the other information in the rating system definition.

Figure 11:
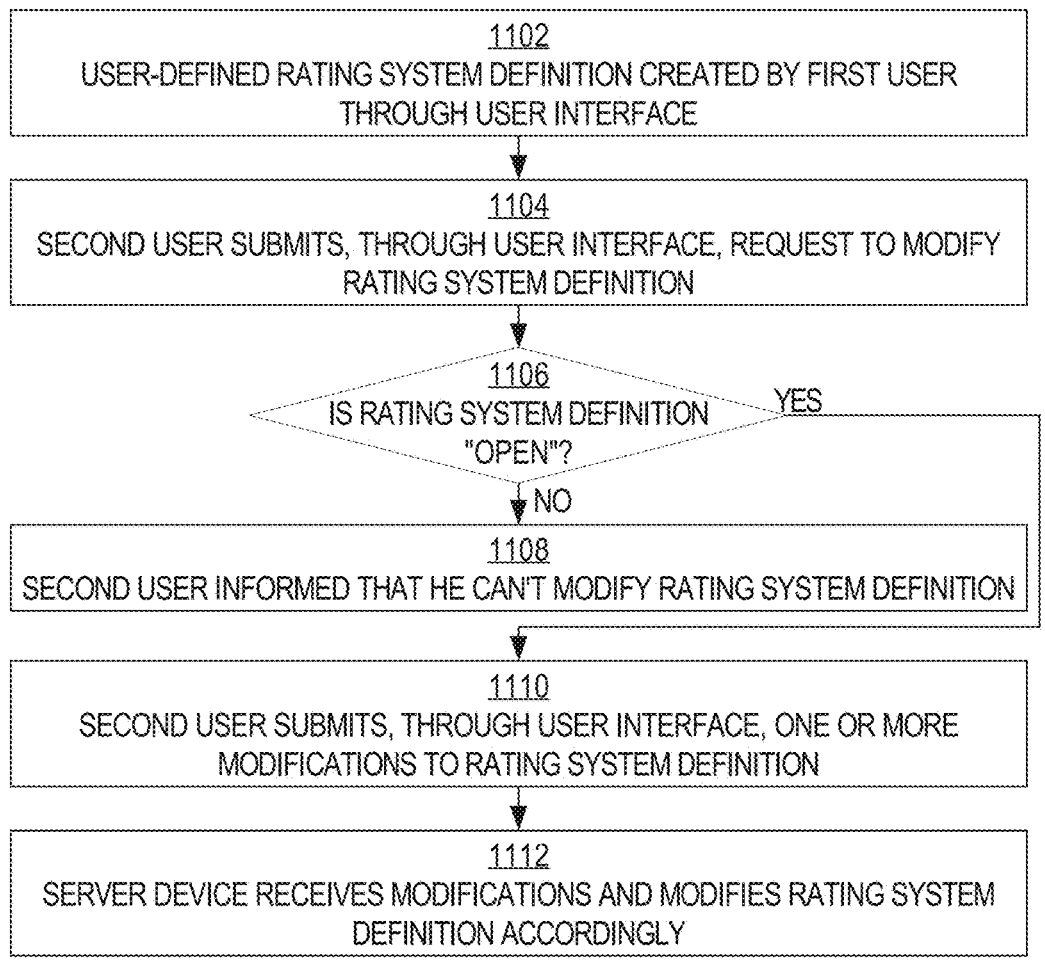
FIG. 11 is a flow diagram that illustrates the steps of a technique for generating a collaboratively defined customized rating system, according to one embodiment of the invention.

FIG. 11 is a flow diagram that illustrates the steps of a technique for generating a collaboratively defined customized rating system, according to one embodiment of the invention. Using the technique described with reference to FIG. 11, multiple users may contribute to the definition of a customized rating system. In various alternative embodiments of the invention, more or fewer steps than those shown in FIG. 11 may be performed.

In block 1102, a user-defined rating system definition is created by a first user through a user interface. For example, a user of personal computer 104 (the "first user") may define a rating system definition, including one or more ratings, using a user interface contained within a web page that rating system server 112 sent to personal computer 104 via Internet 108 and LAN 106. The first user may specify, through the user interface, that the rating system definition is "open."

In block 1104, a second user submits, through a user interface, to a service device, a request to modify the rating system definition. The second user is a different person than the first user. The first user and the second user may live in different houses, in different cities, and even in different countries. For example, using a personal computer other than personal computer 104, the second user may submit, to rating system server 112 via Internet 108, a request to modify the rating system definition. Although FIG. 11 illustrates a process by which a user can submit a request to modify an existing rating system definition, in one embodiment of the invention, users other than a rating system definition's creator are not even given the opportunity, via any user interface, to request the modification of any rating system definition that has been designated by the creator as being "closed." In such an embodiment of the invention, users other than the creator are only given the opportunity to request the modification of existing rating systems that have been designated as being "open."

In block 1106, in response to receiving the second user's request, the server device determines whether the rating system definition is "open." For example, rating system server 112 may make such a determination based on the rating system definition that was created in block 1102. If the rating system definition is "open," then control passes to block 1110. Otherwise, control passes to block 1108.

In block 1108, the second user is informed that he is not allowed to modify the rating system definition. For example, rating system server 112 may send, to the second user's personal computer, a web page that so informs the second user.

Alternatively, in block 1110, the second user submits, through a user interface, to the server device, one or more modifications to the rating system definition. Examples of such modifications include adding a new rating, deleting an existing rating, altering an existing rating, and changing the "restrictiveness" of an existing rating. Other modifications may be possible. Using a personal computer other than personal computer 104, the second user may submit, to rating system server 112 via Internet 108, one or more modifications to the rating system definition.

In block 1112, the server device receives the one or more modifications and modifies the rating system definition in accordance with the one or more modifications. For example, rating system server 112 may receive the one or more modifications and automatically alter the rating system definition in accordance with the one or more modifications. Rating system server 112 may propagate the changed rating system definition to interested DVRs automatically and/or in response to queries from those DVRs.

In an embodiment of the invention described above, users other than the creator of a customized rating system are permitted to modify the rating system definition for that customized rating system without the discretion of the creator. However, in an alternative embodiment of the invention, after the one or more modifications have been received at the server device, the server device does not automatically modify the rating system definition accordingly. Instead, the server device notifies the creator (e.g., via e-mail or a message that is presented to the creator when the creator next accesses the server device) that modifications to the rating system definition have been proposed. The creator may review the proposed modifications and accept or reject the modifications as the creator desires. In such an embodiment of the invention, the server device applies to the rating system definition only those modifications that the creator accepts. According to one embodiment of the invention, in order to prevent proposed modifications from being applied to a rating system definition until the creator has reviewed and approved of those modifications, the creator may designate the rating system as being "moderated" rather than merely "open."

Modifications to a rating system definition may be submitted by multiple different users. Thus, under some circumstances, a customized rating system may be the collaborative product of the ideas and efforts of multiple users.

4.0 Example Dvr

Figure 5:
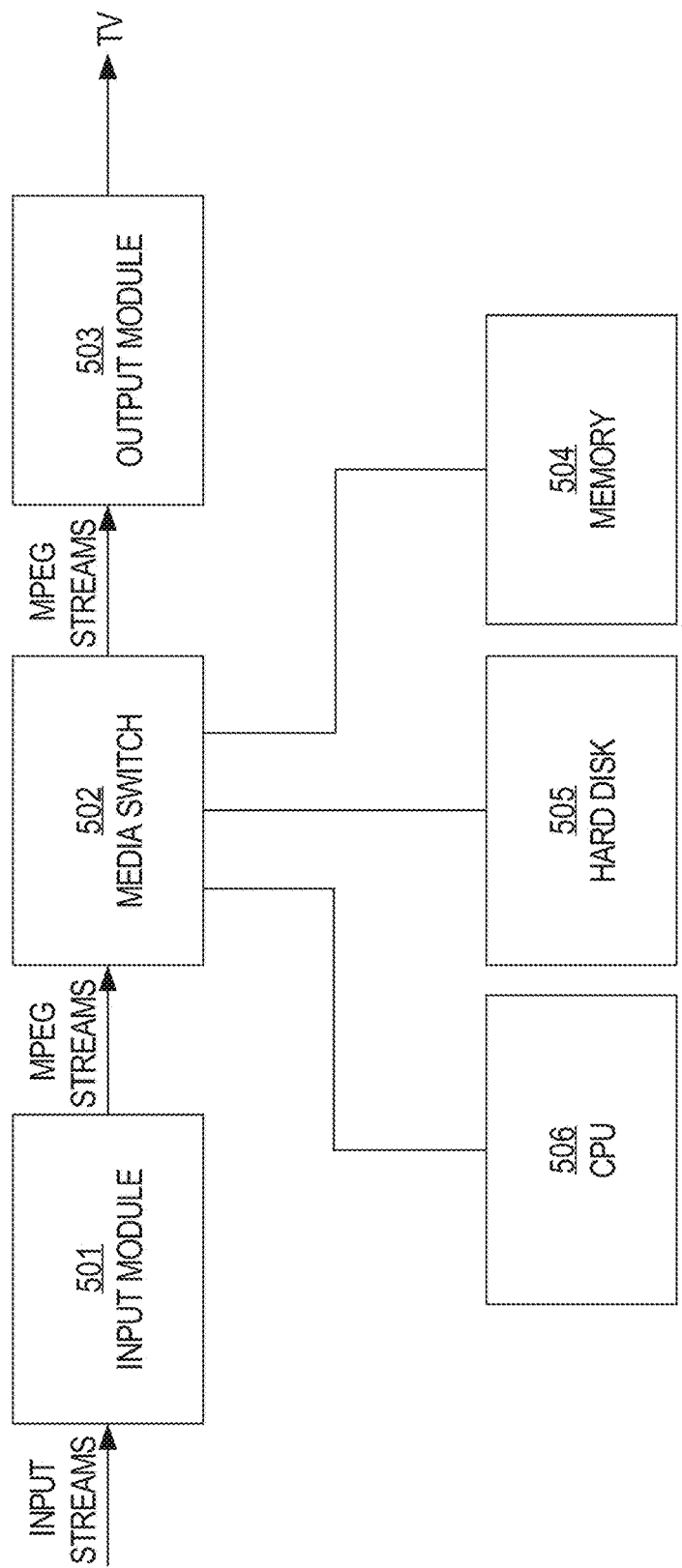
FIG. 5 is a block diagram that shows an example of the internal structure and operation of a DVR, according to an embodiment of the invention.

FIG. 5 is a block diagram that shows an example of the internal structure and operation of a DVR, according to an embodiment of the invention. An example of the internal structure and operation of a DVR is further described in U.S. Pat. No. 6,233,389, which is incorporated by reference as though originally disclosed herein.

The DVR shown in FIG. 5 comprises an input module 501, a media switch 502, and an output module 503. Input module 501 receives television (TV) input streams in any of a variety of forms. For example, a TV input stream received by input module 501 may take the form of a National Television Standards Committee (NTSC) compliant signal or a PAL compliant broadcast signal. For another example, a TV input stream received by input module 501 may take a digital form such as a Digital Satellite System (DSS) compliant signal, a Digital Broadcast Services (DBS) compliant signal, or an Advanced Television Standards Committee (ATSC) compliant signal. DBS, DSS, and ATSC are based on standards called Moving Pictures Experts Group 2 (MPEG-2) and MPEG-2 Transport. MPEG-2 Transport is a standard for formatting the digital data stream from the TV source transmitter so that a TV receiver can disassemble the input stream to find programs in the multiplexed signal. According to one embodiment of the invention, input module 501 produces MPEG streams. According to another embodiment of the invention, input module 501 produces streams that are encoded using a different codec.

An MPEG-2 transport multiplex supports multiple programs in the same broadcast channel, which multiple video and audio feeds and private data. Input module 501 tunes the channel to a particular program, extracts a specified MPEG stream from the channel, and feeds the MPEG stream to the rest of the system. Analog TV signals are encoded into a similar MPEG format using separate video and audio encoders, such that the remainder of the system is unaware of how the signal was obtained. Information may be modulated into the vertical blanking interval (VBI) of the analog TV signal in a number of standard ways; for example, the North American Broadcast Teletext Standard (NABTS) may be used to modulate information onto certain lines of an NTSC signal, which the FCC mandates the use of a certain other line for closed caption (CC) and extended data services (EDS). Such signals are decoded by input module 501 and passed to the other modules as if the signals had been delivered via an MPEG-2 private data channel.

Media switch 502 mediates between a microprocessor CPU 506, a hard disk or storage device 505, and memory 504. Input streams are converted to an MPEG stream and sent to media switch 502. Media switch 502 buffers the MPEG stream into memory 504. Media switch 502 then performs two operations if the DVR user is watching real-time TV: media switch 502 sends the MPEG stream to output module 503 and simultaneously writes the MPEG stream to hard disk or storage device 505.

Output module 503 receives MPEG streams as input and produces an analog TV signal according to NTSC, PAL, or other TV standards. Output module 503 comprises an MPEG decoder, an on-screen display (OSD) generator, an analog TV encoder, and audio logic. The OSD generator allows the program logic to supply images which may be overlaid on top of the resulting TV analog signal. Additionally, output module 503 can modulate information supplied by the program logic onto the VBI of the output signal in a number of standard formats, including NABTS, CC, and EDS.

5.0 Hardware Overview

Figure 4:
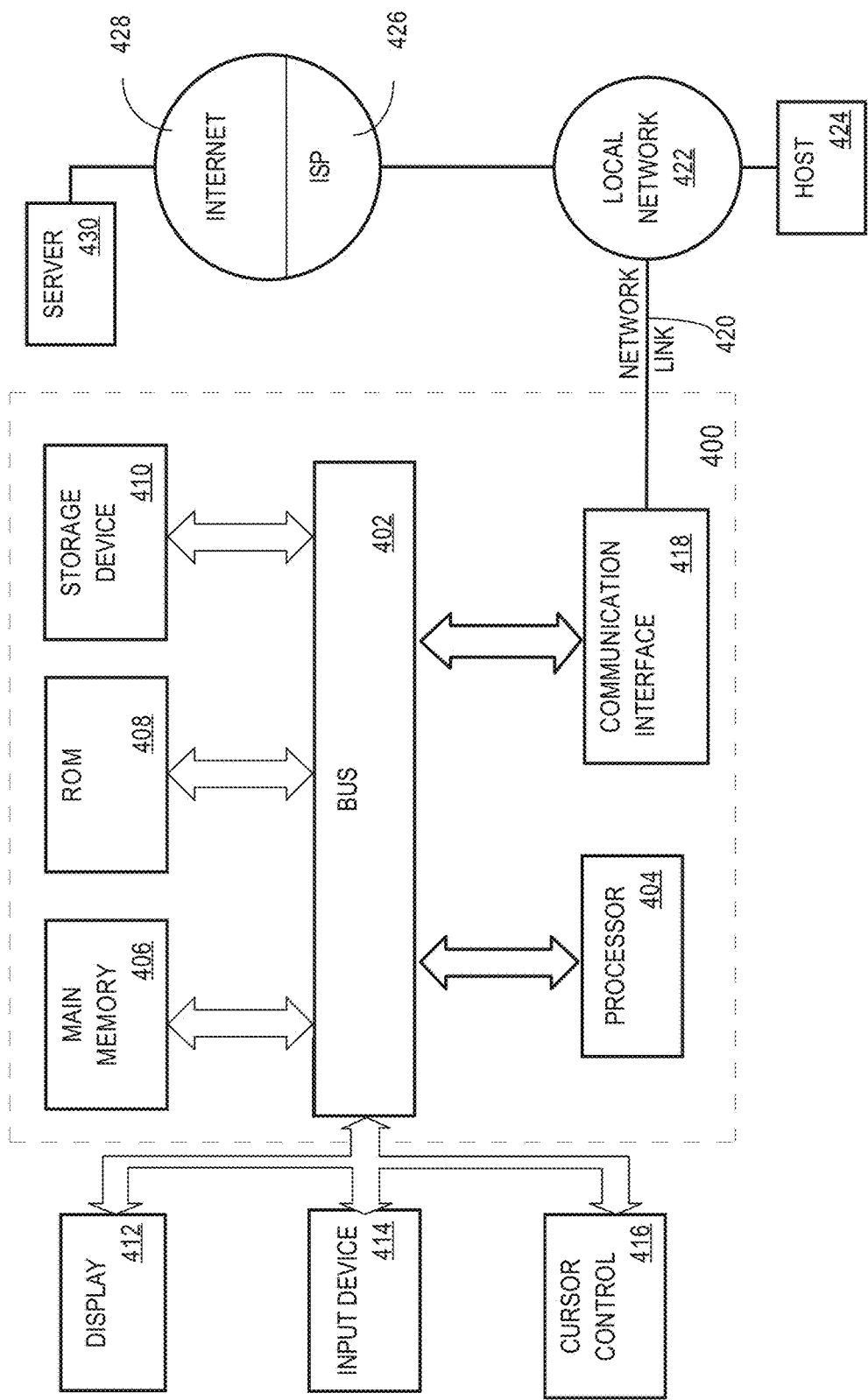
FIG. 4 is a block diagram of a system on which embodiments of the invention may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 400, various machine-readable media are involved, for example, in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method comprising:
  receiving a rating system definition that a user submitted via a user interface at a client device, wherein the rating system definition provides two or more rating options for a plurality of users to select at least one particular rating option from the two or more rating options as a rating for a user-selected entity;
  sending at least a part of the rating system definition to a media device, wherein the media device is registered to someone other than the user;
  in response to receiving a modification request from the user submitted via the user interface, modifying the rating system definition based on the received modification request by defining at least one additional rating option for the rating system definition to result in a new rating system definition that comprises the two or more rating options and the added one additional rating option for the plurality of users to choose from, wherein the one additional rating option was unavailable for the plurality of users to choose prior to the modification of the rating system definition; and
  in response to modifying the rating system definition resulting in the new rating system definition, automatically transmitting the new rating system definition to a plurality of media devices on which the new rating system definition is stored, the plurality of media devices including the media device;
  wherein the method is performed by one or more computing devices.

2. A method as recited in claim 1, wherein the user interface at the client device is implemented as an Internet browser program.

3. A method as recited in claim 1, further comprising:
  receiving a request to associate an entity with a selected rating, wherein the selected rating is at least one of the at least one particular rating option and the at least one additional rating option of the modified rating system definition; and
  in response to receiving the request, storing an association between the entity and the selected rating.

4. A method as recited in claim 3, further comprising:
  determining whether the selected rating is allowable based on user-specified control criteria; and
  in response to a determination that selected rating is not allowable based on the user-specified control criteria, performing at least one of (a) preventing content contained within the entity from being played, and (b) preventing information about the entity from being displayed;
  wherein preventing information about the entity from being displayed comprises at least one of (a) preventing information about the entity from being displayed in an electronic program guide, and (b) preventing a channel from being displayed in an electronic program guide; and
  wherein the user-specified control criteria comprises at least one of (a) a most restrictive allowable rating selected from the two or more rating options and the at least one additional rating option, and (b) a least restrictive allowable rating selected from the two or more rating options and the at least one additional rating option.

5. A method as recited in claim 3, further comprising:
  determining whether the selected rating falls within a range of acceptable ratings that is specified within user-specified control criteria by both a least restrictive allowable rating and a most restrictive allowable rating; and
  in response to a determination that the particular rating option does not fall within the range of acceptable ratings that is specified within the user-specified control criteria, preventing content contained within the entity from being played;
  wherein the least restrictive allowable rating corresponds to a maximum age and wherein the most restrictive allowable rating corresponds to a minimum age.

6. A method as recited in claim 3, further comprising:
  displaying the selected rating in connection with information about the entity.

7. A method as recited in claim 1, wherein the user-selected entities comprises at least one of (a) a television channel, (b) a television series that comprises two or more episodes, (c) an episode of a television series that comprises two or more episodes, (d) a movie, (e) a sporting event, (f) a television special program, (g) a television miniseries, (h) content downloadable over a network, or (i) a commercial.

8. A method as recited in claim 1, further comprising:
  receiving user input that specifies a selected rating selected from the group consisting of the two or more rating options and the at least one additional rating option;
  based on the selected rating, and based on ratings that are associated with entities in a set of entities, automatically selecting one or more particular entities from among the set of entities; and displaying a list of the one or more particular entities.

9. A method as recited in claim 1, wherein modifying the rating system definition further comprises modifying the rating system definition based on an input from a second user other than the user.

10. A non-transitory computer-readable storage medium storing one or more sequences of instructions, which instructions, when executed by one or more processors, cause the one or more processors to:

receive a rating system definition that a user submitted via a user interface at a client device, wherein the rating system definition provides two or more rating options for a plurality of users to select at least one particular rating option from the two or more rating options as a rating for a user-selected entity;

send at least a part of the rating system definition to a media device, wherein the media device is registered to someone other than the user;

in response to receiving a modification request from the user submitted via the user interface, modify the rating system definition based on the received modification request by defining at least one additional rating option for the rating system definition to result in a new rating system definition that comprises the two or more rating options and the added one additional rating option for the plurality of users to choose from, wherein the one additional rating option was unavailable for the plurality of users to choose prior to the modification of the rating system definition; and in response to modifying the rating system definition resulting in the new rating system definition, automatically transmit the new rating system definition to a plurality of media devices on which the new rating system definition is stored, the plurality of media devices including the media device.

11. A non-transitory computer-readable storage medium as recited in claim 10, wherein the user interface at the client device is implemented as an Internet browser program.

12. A non-transitory computer-readable storage medium as recited in claim 10, wherein the steps further comprise:

receiving a request to associate an entity with a selected rating, wherein the selected rating is at least one of the at least one particular rating option and the at least one additional rating option of the modified rating system definition; and in response to receiving the request, storing an association between the entity and the selected rating.

13. A non-transitory computer-readable storage medium as recited in claim 12, wherein the steps further comprise:

determining whether the selected rating is allowable based on user-specified control criteria; and in response to a determination that selected rating is not allowable based on the user-specified control criteria, performing at least one of (a) preventing content contained within the entity from being played, and (b) preventing information about the entity from being displayed;

wherein preventing information about the entity from being displayed comprises at least one of (a) preventing information about the entity from being displayed in an electronic program guide, and (b) preventing a channel from being displayed in an electronic program guide; and wherein the user-specified control criteria comprises at least one of (a) a most restrictive allowable rating selected from the two or more rating options and the at least one additional rating option, and (b) a least restrictive allowable rating selected from the two or more rating options and the at least one additional rating option.

14. A non-transitory computer-readable storage medium as recited in claim 12, wherein the steps further comprise:

determining whether the selected rating falls within a range of acceptable ratings that is specified within user-specified control criteria by both a least restrictive allowable rating and a most restrictive allowable rating; and in response to a determination that the particular rating option does not fall within the range of acceptable ratings that is specified within the user-specified control criteria, preventing content contained within the entity from being played;

wherein the least restrictive allowable rating corresponds to a maximum age and wherein the most restrictive allowable rating corresponds to a minimum age.

15. A non-transitory computer-readable storage medium as recited in claim 12, wherein the steps further comprise:

displaying the selected rating in connection with information about the entity.

16. A non-transitory computer-readable storage medium as recited in claim 10, wherein the user-selected entities comprises at least one of (a) a television channel, (b) a television series that comprises two or more episodes, (c) an episode of a television series that comprises two or more episodes, (d) a movie, (e) a sporting event, (f) a television special program, (g) a television miniseries, (h) content downloadable over a network, or (i) a commercial.

17. A non-transitory computer-readable storage medium as recited in claim 10, wherein the steps further comprise:

receiving user input that specifies a selected rating selected from the group consisting of the two or more rating options and the at least one additional rating option;

based on the selected rating, and based on ratings that are associated with entities in a set of entities, automatically selecting one or more particular entities from among the set of entities; and displaying a list of the one or more particular entities.

18. A non-transitory computer-readable storage medium as recited in claim 10, wherein modifying the rating system definition further comprises modifying the rating system definition based on an input from a second user other than the user.

19. An apparatus comprising:

a subsystem, implemented at least partially in hardware, that receives a rating system definition that a user submitted via a user interface at a client device, wherein the rating system definition provides two or more rating options for a plurality of users to select at least one particular rating option from the two or more rating options as a rating for a user-selected entity;

a subsystem, implemented at least partially in hardware, that sends at least a part of the rating system definition to a media device, wherein the media device is registered to someone other than the user;

a subsystem, implemented at least partially in hardware, that in response to receiving a modification request from the user submitted via the user interface, modifies the rating system definition based on the received modification request by defining at least one additional rating option for the rating system definition to result in a new rating system definition that comprises the two or more rating options and the added one additional rating option for the plurality of users to choose from, wherein the one additional rating option was unavailable for the plurality of users to choose prior to the modification of the rating system definition; and a subsystem, implemented at least partially in hardware, that, in response to modifying the rating system definition resulting in the new rating system definition, automatically transmits the new rating system definition to a plurality of media devices on which the new rating system definition is stored, the plurality of media devices including the media device.

20. An apparatus as recited in claim 19, wherein the user interface at the client device is implemented as an Internet browser program.

21. An apparatus as recited in claim 19, further comprising:

a subsystem, implemented at least partially in hardware, that receives a request to associate an entity with a selected rating, wherein the selected rating is at least one of the at least one particular rating option and the at least one additional rating option of the modified rating system definition; and a subsystem, implemented at least partially in hardware, that, in response to receiving the request, stores an association between the entity and the particular rating.

22. An apparatus as recited in claim 21, further comprising:

a subsystem, implemented at least partially in hardware, that determines whether the selected rating is allowable based on user-specified control criteria; and a subsystem, implemented at least partially in hardware, that, in response to a determination that that selected rating is not allowable based on the user-specified control criteria, performs at least one of (a) preventing content contained within the entity from being played, and (b) preventing information about the entity from being displayed;

wherein the subsystem that prevents information about the entity from being displayed comprises at least one of (a) a subsystem, implemented at least partially in hardware, that prevents information about the entity from being displayed in an electronic program guide, and (b) a subsystem, implemented at least partially in hardware, that prevents a channel from being displayed in an electronic program guide; and wherein the user-specified control criteria comprises at least one of (a) a most restrictive allowable rating selected from the two or more rating options and the at least one additional rating option, and (b) a least restrictive allowable rating selected from the two or more rating options and the at least one additional rating option.

23. An apparatus as recited in claim 21, further comprising:

a subsystem, implemented at least partially in hardware, that determines whether the selected rating falls within a range of acceptable ratings that is specified within user-specified control criteria by both a least restrictive allowable rating and a most restrictive allowable rating; and a subsystem, implemented at least partially in hardware, that, in response to a determination that the particular rating option does not fall within the range of acceptable ratings that is specified within the user-specified control criteria, prevents content contained within the entity from being played;

wherein the least restrictive allowable rating corresponds to a maximum age and wherein the most restrictive allowable rating corresponds to a minimum age.

24. An apparatus as recited in claim 21, further comprising:

a subsystem, implemented at least partially in hardware, that displays the selected rating in connection with information about the entity.

25. An apparatus as recited in claim 19, wherein the user-selected entities comprises at least one of (a) a television channel, (b) a television series that comprises two or more episodes, (c) an episode of a television series that comprises two or more episodes, (d) a movie, (e) a sporting event, (f) a television special program, (g) a television miniseries, (h) content downloadable over a network, or (i) a commercial.

26. An apparatus as recited in claim 19, further comprising:

a subsystem, implemented at least partially in hardware, that receives user input that specifies a selected rating selected from the group consisting of the two or more rating options and the at least one additional rating option;

a subsystem, implemented at least partially in hardware, that based on the selected rating, and based on ratings that are associated with entities in a set of entities, automatically selects one or more particular entities from among the set of entities; and a subsystem, implemented at least partially in hardware, that displays a list of the one or more particular entities.

27. An apparatus as recited in claim 19, wherein modifying the rating system definition further comprises modifying the rating system definition based on an input from a second user other than the user.

* * * * *